United States Patent [19]
Lobush et al.

[11] 3,758,694
[45] Sept. 11, 1973

[54] SIMULATED HAND

[76] Inventors: John F. Lobush; Arlene J. Lobush, both of 709 Loma Prieta, Aptos, Calif.

[22] Filed: Apr. 12, 1972

[21] Appl. No.: 243,220

[52] U.S. Cl. .................................. 35/31 R, 116/135
[51] Int. Cl. ............................................ G09b 19/02
[58] Field of Search ..................... 35/1, 8 R, 31 R, 35/31 B, 30; 116/135

[56] References Cited
UNITED STATES PATENTS
2,776,638  1/1957  Whitaker ..................... 116/135 X
3,140,552  7/1964  Mader ............................... 35/31 B
3,452,455  7/1969  Judge ............................... 35/31 R FOREIGN PATENTS OR APPLICATIONS
295,723  5/1929  Great Britain ....................... 35/32

Primary Examiner—Wm. H. Grieb
Attorney—Carl Hoppe, Robert G. Slick et al.

[57] ABSTRACT

A simulated hand is provided for use primarily as a teaching aid wherein the hand has a representation of fingers which may be raised or lowered as well as moved from side-to-side so that any combination can be made of the "fingers" to simulate the fingers of a hand.

1 Claim, 6 Drawing Figures

Patented Sept. 11, 1973

3,758,694

SIMULATED HAND

SUMMARY OF THE INVENTION

It is frequently desirable to provide a simulation of a hand for use as a teaching aid. For instance, in teaching phonetics, the teacher quite often holds up a hand to indicate the proper breakdown of a word into syllables or to aid in spelling. If the teacher holds up her hand she obviously is unable to move around the class and observe the class activities, which is particularly important in the case of written exercises.

In accordance with the present invention, a simulated hand is provided so that the teacher can indicate the position desired of the fingers and then is free to walk around the class and observe the class. The simulated hand also serves to reinforce the learning of the students and to emphasize certain relationships.

DESCRIPTION OF THE PREFERRED EMBODIMENT

The device of the present invention is mounted on the base 7 and includes front member 9, a rear member 11 and end members 13 and 15. The end members 13 and 15 serve as spacers so that there is a space between the front member 9 and the rear member 11. The tops of the end members are beveled as is shown at 17. The front member 9 has five vertical slots as at 19, the purpose for which will be later explained.

Figure 2:
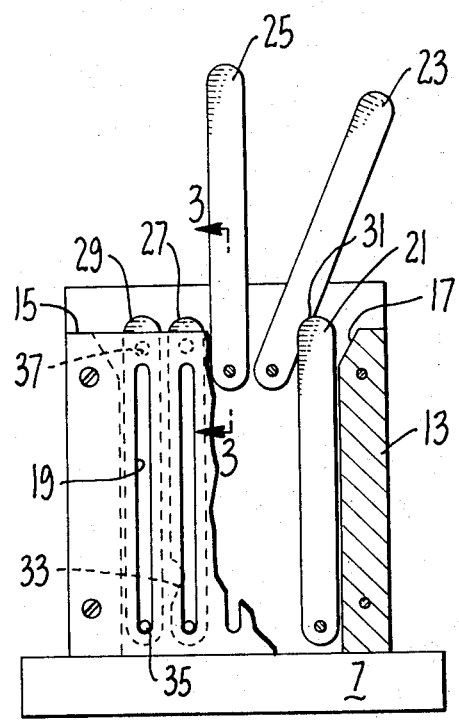
FIG. 2 is a front view of the device shown in FIG. 1 with certain of the parts cut away.

The space between the end members 13 and 15 is wide enough so that the five finger elements 21, 23, 25, 27, and 29 form a loose sliding fit therebetween. The second and fourth finger elements, namely, 23 and 27 have notches 31 and 33 near their bottom outer extremities that when either of these fingers is in a raised position and the adjacent end finger is in a lowered position, the raised finger can be swung outwardly, as can best be seen in the case of finger 23 in FIG. 2.

Figure 1:
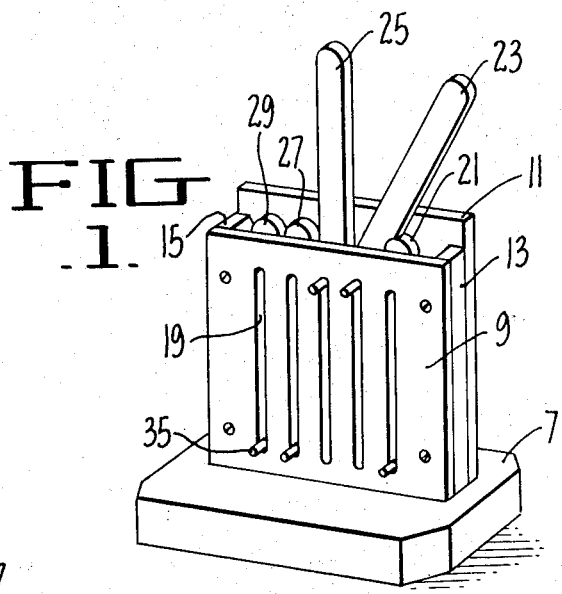
FIG. 1 is a perspective view of a device embodying the present invention.
Figure 3:
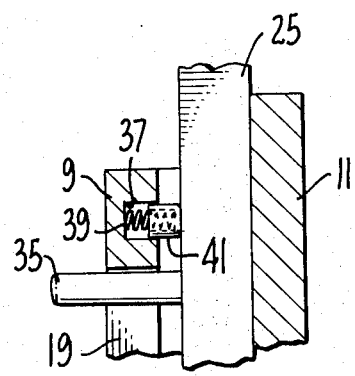
FIG. 3 is an enlarged section on the line 3—3 of FIG. 2.

FIG. 1 is a perspective view of a device embodying the present lherebetwen. T cToinger elements, nmel0J23 and 2 slots 19. In addition, just above each of the slots 19 a recess 37 is provided in the rear surface of the front member 9 into which a spring 39 is fitted having a loosely fitting cap 41 thereon which bears against the finger. Thus, referring to FIG. 3, the cap 41 is pushed by spring 39 against finger 25 so that the finger will stay in any position in which it is placed. Also, it will be apparent that the pin 35 forms a handle so that the finger can be raised or lowered at will.

The fingers form a loose sliding fit within the box-like member and are capable of not only being raised and lowered but also can move at an angle from side-to-side into various configurations. This is made possible, not only by the loose fit, but also by the recesses 17 on the end members 13 and 15 and also the notches 31 and 33 in fingers 2 and 4. Thus, the fingers can be placed in any desired configuration, either together or apart to serve as a teaching aid, for instance in English or Arithmetic as the following examples illustrate.

Figure 4:
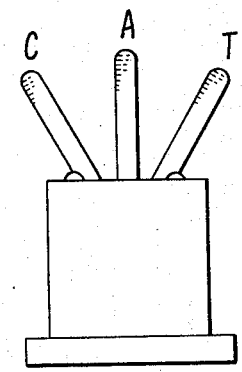
FIGS. 4, 5 and 6 illustrate typical configurations of the fingers of the simulated hand.

When the children have learned the vowel, consonant and phonogram sounds, the teacher then uses the simulated hand for the dictation of words. Example: The teacher says today we are going to write the word CAT. She then pushes up three fingers on the simulated hand as is shown in FIG. 4, indicating that there are three letters in the word CAT. As she points to each finger, the children say the sounds in the word cat, not the letter names, one at a time.

Figure 5:
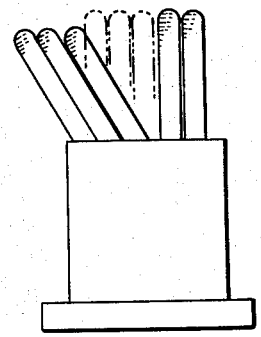

Finally, the children write the word CAT on their paper. If a word contains a phonogram such as SH, in the word ship two fingers slide together indicating to the class that in this word we have a phonogram as is shown in FIG. 5.

Figure 6:

The simulated hand may also be used for beginning addition and subtraction. Example: The children are learning number sentences with sums of five or less. All five fingers on the simulated hand are pushed up. The children take turns sliding the five fingers to make different sets that equal five. Example: Three fingers and two fingers are five in all. Subtraction: All five fingers on the simulated hand are up. A child pushes three fingers down or aside, indicating that 5—3 = 2 as is shown in FIG. 6.

Although a specific form of spring has been illustrated, other spring means can be used to hold the fingers in the desired configuration. For instance, a wafer spring might be inserted on each pin 35 between the front member 9 and finger 25 and so on.

Reference has been made to the front and back of the device but this has been for descriptive purposes only. Preferably the smooth side of the device is turned toward the students since this provides a minimum of distraction.

It will be obvious to those skilled in the art that many variations can be made in the exact structure shown and described. For instance, a single hand having five fingers has been illustrated and it will be obvious that a device can easily be built simulating both hands with ten fingers. The device can be made of wood, plastic or metal.

I claim:

1. A simulated hand comprising in combination:
   a. a box-like member having an open top and having five finger elements slidably mounted therein;
   b. slots in one face of box-like element;
   c. pin means extending from each of said finger elements through a corresponding slot whereby said finger can be individually raised and lowered;
   d. said box-like member and said finger elements having a loose fit between the elements themselves and between the elements and the box member whereby said fingers can be swung from side to side when in the raised position;
   e. the second and fourth of said five finger elements being notched near their bottom, outer extremities, said notches fitting into the top surface of the adjacent outer finger element when the latter is in a lowered position whereby said notched finger element can be raised and swung outward over the adjacent end member with the top of said end member fitting into said notch.

* * * * *